United States Patent
Amir et al.

(10) Patent No.: US 11,645,501 B2
(45) Date of Patent: May 9, 2023

(54) DISTRIBUTED, EVENT-BASED COMPUTATION USING NEUROMORPHIC CORES

(71) Applicant: INTERNATIONAL BUSINESS MACHINES CORPORATION, Armonk, NY (US)

(72) Inventors: Arnon Amir, San Jose, CA (US); David Berg, Los Gatos, CA (US); Pallab Datta, San Jose, CA (US); Jeffrey A. Kusnitz, Campbell, CA (US); Hartmut Penner, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 903 days.

(21) Appl. No.: 15/908,459

(22) Filed: Feb. 28, 2018

(65) Prior Publication Data
US 2019/0266481 A1 Aug. 29, 2019

(51) Int. Cl.
*G06N 3/04* (2023.01)
*G06N 3/049* (2023.01)
(Continued)

(52) U.S. Cl.
CPC ............ *G06N 3/049* (2013.01); *G06N 3/045* (2023.01); *G06N 3/063* (2013.01); *G06N 3/065* (2023.01); *G06N 20/00* (2019.01)

(58) Field of Classification Search
CPC .......................... G06N 3/0635; G06N 3/0454
See application file for complete search history.

(56) References Cited

U.S. PATENT DOCUMENTS

| 8,712,941 B2 | 4/2014 | Izhikevich et al. |
| 8,909,576 B2 * | 12/2014 | Akopyan ............ G06N 3/04 706/27 |

(Continued)

FOREIGN PATENT DOCUMENTS

WO  WO-2018215023 A1 * 11/2018 ............ G06F 1/08

OTHER PUBLICATIONS

Mayuresh Oak & Lennard Streat, "IBM TrueNorth", Spring 2015, (http://meseec.ce.rit.edu/722-projects/spring2015/2-1.pdf) (Year: 2015).*

(Continued)

*Primary Examiner* — Ying Yu Chen
*Assistant Examiner* — Chase P. Hinckley
(74) *Attorney, Agent, or Firm* — Erik A. Huestis; Stephen J. Kenny; Foley Hoag, LLP

(57) ABSTRACT

Systems for distributed, event-based computation are provided. In various embodiments, the systems include a plurality of neurosynaptic processors and a network interconnecting the plurality of neurosynaptic processors. Each neurosynaptic processor includes a clock uncoupled from the clock of each other neurosynaptic processor. Each neurosynaptic processor is adapted to receive an input stream, the input stream comprising a plurality of inputs and a clock value associated with each of the plurality of inputs. Each neurosynaptic processor is adapted to compute, for each clock value, an output based on the inputs associated with that clock value. Each neurosynaptic processor is adapted to send to another of the plurality of neurosynaptic processors, via the network, the output and an associated clock value.

25 Claims, 13 Drawing Sheets

(51) Int. Cl.
   *G06N 3/063* (2023.01)
   *G06N 3/045* (2023.01)
   *G06N 3/065* (2023.01)
   *G06N 20/00* (2019.01)

(56) References Cited

U.S. PATENT DOCUMENTS

| | | | |
|---|---|---|---|
| 9,104,973 | B2 | 8/2015 | Izhikevich et al. |
| 9,256,823 | B2* | 2/2016 | Sinyavskiy ............ G06N 3/049 |
| 9,269,044 | B2 | 2/2016 | Akopyan et al. |
| 9,460,387 | B2* | 10/2016 | Sinyavskiy ............ G06N 3/049 |
| 9,495,634 | B2 | 11/2016 | Modha |
| 9,515,789 | B2 | 12/2016 | Zhang et al. |
| 9,563,841 | B2 | 2/2017 | Alvarez-Icaza Rivera et al. |
| 10,210,134 | B2* | 2/2019 | Burchard ............... G06N 20/00 |
| 10,387,769 | B2* | 8/2019 | Neil ...................... G06N 3/0445 |
| 10,429,440 | B2* | 10/2019 | Huang ............. G01R 31/31704 |
| 10,528,863 | B2* | 1/2020 | Hawkins ................ G06N 3/084 |
| 10,657,438 | B2* | 5/2020 | Lie ......................... G06F 9/3001 |
| 10,824,937 | B2* | 11/2020 | Davies ................... G06N 3/063 |
| 10,867,238 | B2* | 12/2020 | Davies .................... G06N 3/08 |
| 10,885,425 | B2* | 1/2021 | Imam ..................... G06N 3/049 |
| 10,891,543 | B2* | 1/2021 | Hosokawa ............. G06N 3/088 |
| 10,956,811 | B2* | 3/2021 | Davies ................... G06N 3/049 |
| 10,970,630 | B1* | 4/2021 | Aimone .................. G06N 3/04 |
| 11,037,054 | B2* | 6/2021 | Davies ................... G06N 3/088 |
| 2013/0031039 | A1* | 1/2013 | Sim ........................ G06N 3/049 |
| | | | 706/26 |
| 2013/0073497 | A1* | 3/2013 | Akopyan ................ G06N 3/04 |
| | | | 706/27 |
| 2013/0073500 | A1 | 3/2013 | Szatmary et al. |
| 2015/0112911 | A1* | 4/2015 | Jackson ................. G06N 3/063 |
| | | | 706/29 |
| 2015/0302295 | A1* | 10/2015 | Rivera .................... G06N 3/04 |
| | | | 706/25 |
| 2016/0125289 | A1* | 5/2016 | Amir ...................... G06N 3/063 |
| | | | 706/27 |
| 2016/0132765 | A1* | 5/2016 | Alpert .................... G06F 1/3243 |
| | | | 706/28 |
| 2016/0371583 | A1 | 12/2016 | Hosokawa et al. |
| 2016/0379110 | A1 | 12/2016 | Eleftheriou et al. |
| 2016/0379137 | A1* | 12/2016 | Burger .................... G06F 9/46 |
| | | | 706/12 |
| 2017/0033120 | A1 | 2/2017 | Lee et al. |
| 2017/0061278 | A1 | 3/2017 | Lee |
| 2017/0270410 | A1* | 9/2017 | Denham ................ G06N 3/047 |
| 2018/0053090 | A1* | 2/2018 | Voelker .................. G06N 3/049 |
| 2018/0174024 | A1* | 6/2018 | Lin ......................... G06N 3/063 |
| 2018/0174027 | A1* | 6/2018 | Davies .................... G06N 3/049 |
| 2018/0174028 | A1* | 6/2018 | Lin ............................ G06N 3/04 |
| 2018/0174032 | A1* | 6/2018 | Davies .................... G06N 3/08 |
| 2018/0174040 | A1* | 6/2018 | Davies .................... G06N 3/08 |
| 2018/0174053 | A1* | 6/2018 | Lin ......................... G06N 3/049 |
| 2018/0232631 | A1* | 8/2018 | Appuswamy .......... G06N 3/049 |
| 2018/0322384 | A1* | 11/2018 | Augustine .............. G06N 3/049 |
| 2019/0042910 | A1* | 2/2019 | Krishnamurthy ...... G06N 3/049 |
| 2019/0042920 | A1* | 2/2019 | Akin ...................... G06N 3/0481 |
| 2019/0042942 | A1* | 2/2019 | Natroshvili ............ G06N 3/049 |
| 2019/0102669 | A1* | 4/2019 | Chen ...................... G06N 3/0454 |
| 2019/0138892 | A1* | 5/2019 | Kim ........................ G06N 3/049 |
| 2019/0197391 | A1* | 6/2019 | Chen ........................ G06N 3/08 |
| 2019/0236444 | A1* | 8/2019 | Cassidy ............... G06N 3/0445 |
| 2020/0272891 | A1* | 8/2020 | Terasaki ................. G06N 3/063 |
| 2021/0124407 | A1* | 4/2021 | Hoppner ............... G06F 1/3228 |

OTHER PUBLICATIONS

Sawada et al., "TrueNorth Ecosystem for Brain-Inspired Computing: Scalable Systems, Software, and Applications", Nov. 2016, IEEE, pp. 130-141 (Year: 2016).*

Amir et al., "Cognitive Computing Programming Paradigm: A Corelet Language for Composing Networks of Neurosynaptic Cores", 2013 (Year: 2013).*

Merolla et al., "A million spiking-neuron integrated circuit with a scalable communication network and interface", Aug. 8, 2014, Science, vol. 345, pp. 668-673 (Year: 2014).*

Moradi et al., "A scalable multi-core architecture with heterogeneous memory structures for Dynamic Neuromorphic Asynchronous Processors (DYNAPs)", Aug. 16, 2017, arXiv:1708.04198v2 (Year: 2017).*

Amir et al., "A Low Power, Fully Event-Based Gesture Recognition System", Jul. 1, 2017, IEEE, DOI 10.1109/CVPR.2017.781 (Year: 2017).*

Stromatias et al., "Power analysis of large-scale, real-time neural networks on SpiNNaker", Aug. 1, 2013, IEEE (Year: 2013).*

Shrestha et al., "A Spike-Based Long Short-Term Memory on a Neurosynaptic Processor" Dec. 14, 2017, pp. 631-637. (Year: 2017).*

Liu et al., "Exploring Sparsity of Firing Activities and Clock Gating for Energy-Efficient Recurrent Spiking Neural Processors" Aug. 15, 2017, pp. (Year: 2017).*

Alom et al., "Quadratic Unconstrained Binary Optimization (QUBO) on Neuromorphic Computing System" Jul. 3, 2017, pp. 3922-3929. (Year: 2017).*

Hoppner et al., "Multicore Processor and Method for Dynamically Adjusting a Supply Voltage and a Clock Speed" May 24, 2017, Priority Document 10 2017 111 350.9 (Year: 2017).*

Lin et al., "Programming Spiking Neural Networks on Intel's Loihi" Feb. 27, 2018, pp. 52-61. (Year: 2018).*

Davies et al., "Loihi: A Neuromorphic Manycore Processor with On-Chip Learning" Jan. 16, 2018, pp. 82-99. (Year: 2018).*

Diehl et al., "TrueHappiness: Neuromorphic Emotion Recognition on TrueNorth" Jan. 16, 2016. (Year: 2016).*

Wu et al., "Spatio-Temporal Backpropagation for Training High-Performance Spiking Neural Networks" Sep. 12, 2017, pp. 1-10. (Year: 2017).*

Jimeno Yepes et al., "Improving classification accuracy of feedforward neural networks for spiking neuromorphic chips" May 19, 2017. (Year: 2017).*

Detorakis et al., "Neural and Synaptic Array Transceiver: A Brain-Inspired Computing Framework for Embedded Learning" Oct. 6, 2017, arXiv: 1709.10205v2, pp. 1-30. (Year: 2017).*

Neftci et al., "Event-Driven Random Back-Propagation: Enabling Neuromorphic Deep Learning Machines" Jun. 21, 2017, pp. 1-18. (Year: 2017).*

Park et al., "Hierarchical Address Event Routing for Reconfigurable Large-Scale Neuromorphic Systems" Sep. 15, 2017, pp. 2408-2422. (Year: 2017).*

Lines et al., "Loihi Asynchronous Neuromorphic Research Chip" 2018, pp. 32-33. (Year: 2018).*

Yin et al., "Algorithm and Hardware Design of Discrete-Time Spiking Neural Networks Based on Back Propagation with Binary Activations" Sep. 19, 2017. (Year: 2017).*

Bacry et al., "tick: a Python library for statistical learning, with a particular emphasis on time-dependent modeling" Jul. 10, 2017, pp. 1-5. (Year: 2017).*

Haessig et al., "Spiking Optical Flow for Event-based Sensors Using IBM's TrueNorth Neurosynaptic System" Oct. 26, 2017, pp. 1-11. (Year: 2017).*

Hill et al., "A Spike-Timing Neuromorphic Architecture" 2017. (Year: 2017).*

Ji et al., "Bridging the Gap Between Neural Networks and Neuromorphic Hardware with A Neural Network Compiler" Jan. 18, 2018, pp. 1-3. (Year: 2018).*

Liu et al., "PT-Sike: A Precise-Time-Dependent Single Spike Neuromorphic Architecture with Efficient Supervised Learning" Jan. 2018, pp. 568-573. (Year: 2018).*

Mostafa, Hesham "Supervised learning based on temporal coding in spiking neural networks" Aug. 16, 2017, pp. 1-12. (Year: 2017).*

Mozarafi et al., "First-spike based visual categorization using reward-modulated STDP" Jan. 21, 2018, pp. 1-5. (Year: 2018).*

Zenke et al., "SuperSpike: Supervised learning in multi-layer spiking neural networks" Oct. 14, 2017, pp. 1-25. (Year: 2017).*

Haessig et al., "Spiking Optical Flow for Event-based Sensors Using IBM's TrueNorth Neurosynaptic System" Oct. 26, 2017, arXiv: 1710.09820v1, pp. 1-11. (Year: 2017).*

(56) References Cited

OTHER PUBLICATIONS

Carney et al., "Neuromorphic Kalman filter implementation in IBM's TrueNorth" Oct. 2017, pp. 1-9. (Year: 2017).*
Akopyan et al., "TrueNorth: Design and Tool Flow of a 65 mW 1 Million Neuron Programmable Neurosynaptic Chip" Sep. 17, 2015, pp. 1537-1557. (Year: 2015).*
Petrovici et al.; "Characterization And Compensation Of Network-Level Anomalies In Mixed-Signal Neuromorphic Modeling Platforms", Plos One , vol. 9, Issue 10, Oct. 2014.
Esser et al.; "Convolutional Networks For Fast,Energy-Efficient Neuromorphic Computing", PNAS, vol. 113, No. 4, Oct. 11, 2016.
Moradi et al.; "An Event-Based Neural Network Architecture With An Asynchronous Programmable Synaptic Memory," IEEE Transactions on Biomedical Circuits and Systems, vol. 8, No. 1, Feb. 2014.

* cited by examiner

DISTRIBUTED, EVENT-BASED COMPUTATION USING NEUROMORPHIC CORES

BACKGROUND

Embodiments of the present disclosure relate to neurosynaptic networks, and more specifically, to distributed event-based computation using neuromorphic cores.

BRIEF SUMMARY

According to embodiments of the present disclosure, systems for distributed, event-based computation are provided. In various embodiments, the systems include a plurality of neurosynaptic processors and a network interconnecting the plurality of neurosynaptic processors. Each neurosynaptic processor includes a clock uncoupled from the clock of each other neurosynaptic processor. Each neurosynaptic processor is adapted to receive an input stream, the input stream comprising a plurality of inputs and a clock value associated with each of the plurality of inputs. Each neurosynaptic processor is adapted to compute, for each clock value, an output based on the inputs associated with that clock value. Each neurosynaptic processor is adapted to send to another of the plurality of neurosypatic processors, via the network, the output and an associated clock value.

According to embodiments of the present disclosure, methods of and computer program products for distributed, event-based computation are provided. A neural network is partitioned into a plurality of partitions. A communication graph is determined interconnecting the plurality of partitions. Each of the plurality of partitions is loaded onto one or more neurosynaptic processor. A plurality of network connections is provided interconnecting the plurality of neurosynaptic processors according to the communication graph. A clock is provided at each neurosynaptic processor uncoupled from the clock of each other neurosynaptic processor. At each neurosynaptic processor: an input stream is received, the input stream comprising a plurality of inputs and a clock value associated with each of the plurality of inputs; for each clock value, an output is computed based on the inputs associated with that clock value; and the output and an associated clock value is sent to another of the plurality of neurosypatic processors, via the network.

DETAILED DESCRIPTION

Figure 1:
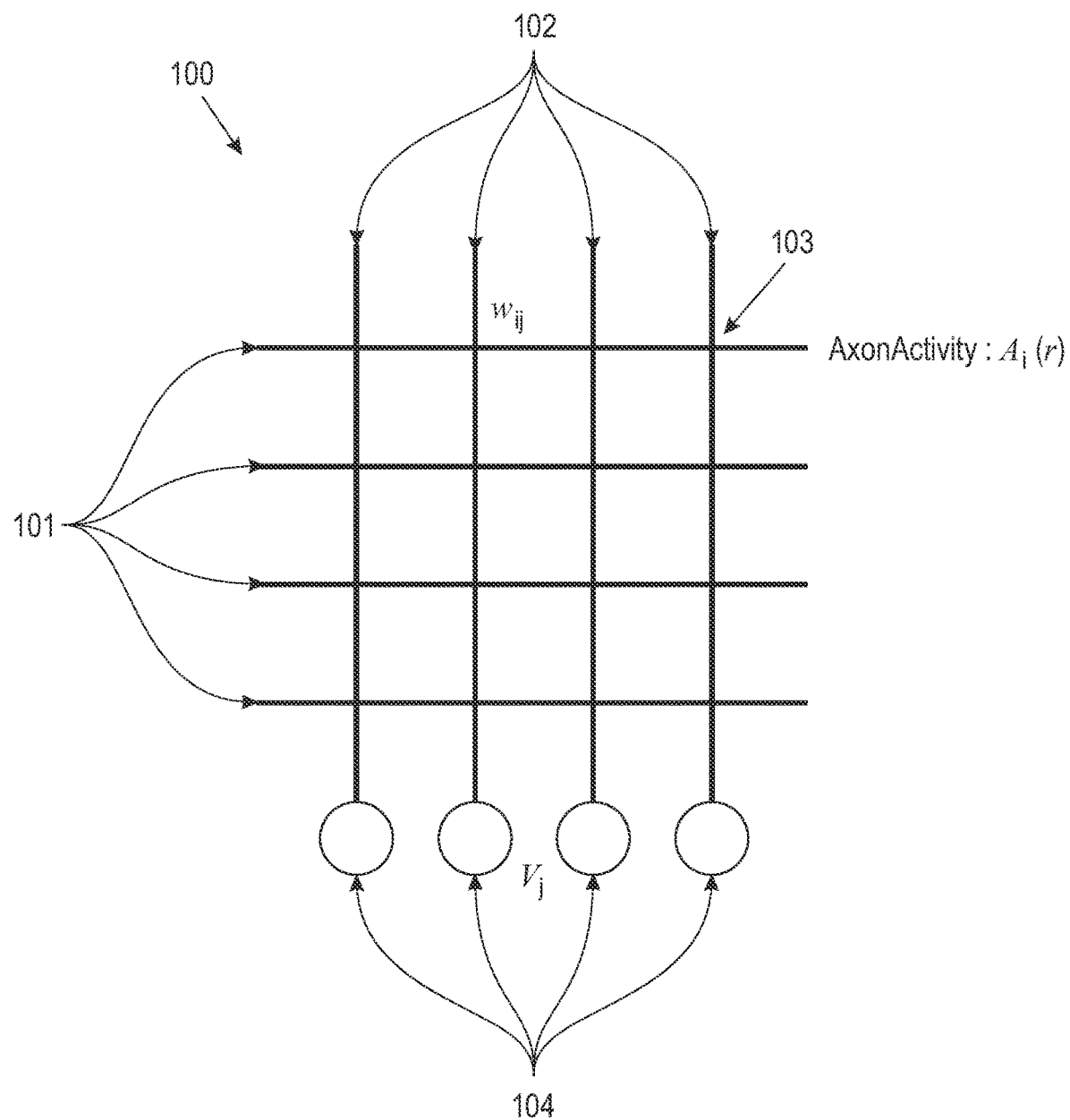
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

It will be appreciated from the above that event-driven core-based neuromorphic chips such as TrueNorth provide computation platforms for implementing event-driven neural networks. Various architectures are realized as sets of neurosynaptic cores tiled on a chip. Each core is a self-contained neural network with axons that accept input events, neurons that produce output events, and programmable synapses that connect axons to neurons within a core. Neurons on one core may send events to axons on the same or a on another core to implement large scale neural networks.

Event-based neuromorphic chips may be implemented using asynchronous logic circuits, driven by their input events and internal events, without a global periodic clock. Such systems may provide the benefit of reduced power consumption and faster processing. In some such embodiments, one or more neuromorphic chips are coupled to other components, such as a CPU, Memory, FPGA, or communication interfaces, to create a neuromorphic-enabled system. A system may load and run network configurations, stream input and output events over communication such as Ethernet, transfer events into and out of the neuromorphic chip(s), advance the time step (tick) and perform other functions as necessary for a given application.

The size of a neural network that can be run on a given hardware implementation is limited by the number of available physical cores on the system. However, some tasks, such as recognition, tracking, decision, and control, and combinations thereof, require larger networks that may surpass the capacity of a single available hardware system. Thus, there is a need to enable the processing of networks larger than the capacity of a single system. A large neural network can be split into several smaller networks, each within the capacity of one neuromorphic-enabled system. However, this imposes a challenging synchronization task between these systems.

For example, in certain neuromorphic systems such as TrueNorth, each core is an asynchronous circuit. A core's computation time may greatly vary from cycle to cycle, depending on its configuration and input. However, in order to achieve a global unique, repeatable, deterministic output from any network on any input, all cores are made synchronized after each computation cycle (or tick). All cores on a single chip may be driven by one common external tick signal. Likewise, all chips on a board may be driven by one common tick signal. To guarantee correct computation, the next tick signal has to wait for all cores to complete their previous tick computation. This means that, at each cycle, all cores have to wait for the slowest core to complete. Similarly, tick synchronization is required between all the systems. A global tick model would require all boards to have interlocked tick clocks, which is challenging over computer networks.

A large neural network, represented as a directed graph, may contain recurrent components, large cycles, feedback loops, and other complex connectivity patterns. When such a graph is split into several smaller networks, the computation requires synchronization between the asynchronous systems.

To address these and other challenges, the present disclosure provides for: splitting a large, arbitrary graph into several components of sizes that fit within the given capacity limits of available neuromorphic enabled systems; generating a communication graph between these systems; loading the component models into the systems; and synchronizing between the systems while transferring event streams between graph components. The present disclosure thus enables efficient utilization of heterogeneous neuromorphic-enabled systems in varying environments. This approach is particularly useful in cloud environments, where the same resources are frequently provisioned to different users for different tasks.

The present disclosure further provides for efficient splitting of a neural network into several components in a way that minimizes the event traffic between systems. In this way, network traffic is minimized and data throughput is maximized.

The present disclosure further provides for hybrid computation using neuromorphic chips, neuromorphic simulators, CPU- and GPU-based transducers, and other systems. Such systems may be combined and synchronized using a unified event-based communication scheme as described herein. This approach further enables distributed communication between remote sensors and centralized neuromorphic enabled systems.

In various embodiments, the present disclosure provides systems and methods for placement-aware, K-cuts, min-weight graph clustering with constrained cluster sizes that determines network portioning. The present disclosure further provides for repackaging network components to define connections and communication between components. The present disclosure further provides for node-to-node event communication channels in a distributed manner using existing infrastructure (e.g., Ethernet). The present disclosure further provides for overall system monitoring and control while assuring partial, yet sufficient synchronization between systems to ensure correct computation.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
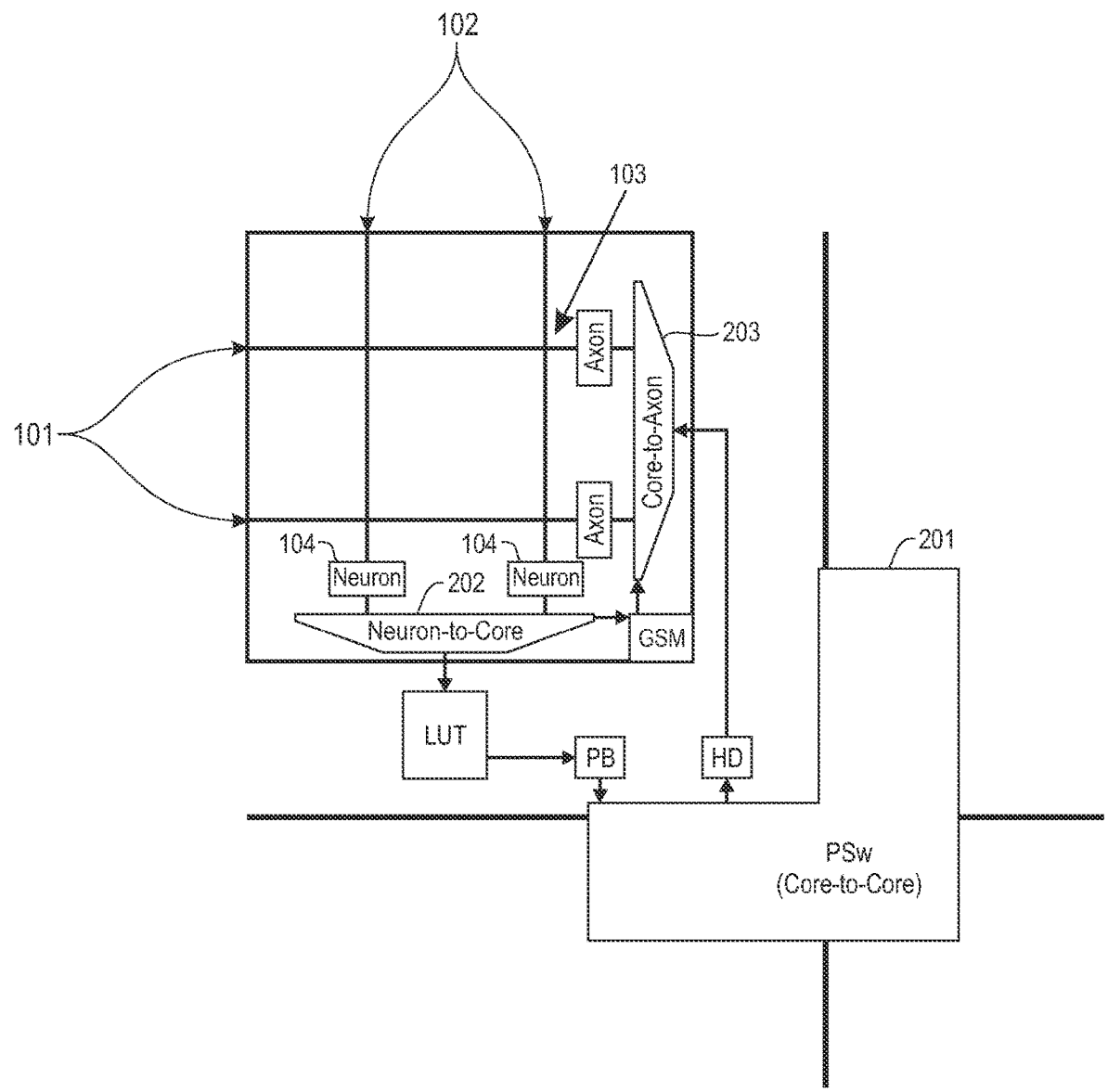
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided. It will be appreciated that although various examples herein are given with respect to TrueNorth, the present disclosure is applicable to a variety of other types of neuromorphic computation.

As described above, in neuromorphic computation, computational elements are referred to as neurons. They operate on inputs (spikes) via axon lines, which are connected to the neurons via synapses. In general, neurons compute independently of each other. In event-based systems (also called data-driven computation), data arrives at the neurons at discrete time stamps. These time stamps can be enumerated, and are denoted as ticks. These time stamps may be regular, such as every millisecond, or varying, where each tick has its own duration.

The neuron computation is carried out once at each tick. This computation can be expressed as $\langle S', N' \rangle = f(S, A, W)$, where S is the neuron state at tick t (including, for example, its membrane potential and buffered axonal inputs); A is a vector of all the neuron's axonal inputs; and W is the neuron's configuration parameters (such as weights, operation modes, thresholds and other parameters). The result S' is the neuron's new state, at tick t+1, and the output N' is the neuron's output at tick t+1. This output is then passed, according to a graph routing configuration, to the axonal inputs of a set of neurons where it serves as input for the next tick.

In core-based neuromorphic system, each core may consist of one or more axons, one or more neurons, and a mesh of synapses connecting axons to neurons. Typically, the connectivity mesh is dense, taking advantages of the physical proximity of these neurons and axons in a chip, and thereby sharing multiple inputs amongst the multiple neurons. The cores are inter-connected by an on-chip network. This network, because it has longer communication distances, is typically designed to be more sparse to conserve energy.

Although a given computation may be defined over discrete time stamps, circuit implementations of the cores may use time multiplexing to compute some neurons using the same circuit during the tick period. For example, in embodiments such as described above in connection with TrueNorth, a core may include one neuron computation circuit that is time multiplexed to compute each of 256 neuron functions during each tick. An asynchronous circuit implementation may only computes those neurons that receive data for a given tick, and skips the computation of neurons if state S does not change during the tick. This results in energy savings and reduction in core computation time. If all cores start to compute at the same time at the beginning of a tick, some cores may quickly finish their computation while others may have to compute more neurons, over a longer period of time.

To ensure correct computation for any possible connectivity graph, all cores and neurons should complete their computation for tick t before any core can start computing tick t+1. A global time barrier method may be applied in the form of an external signal, which may be denoted as the T1 clock. The signal is sent to mark the beginning of a tick, and its originator (which may off-chip) ensures that all cores have completed their computation of the previous tick. Since this internal chip information is not readily available outside of the chip, one strategy is to wait until no more output is observed at the chip outputs, or to wait a predetermined time (e.g., a millisecond). Any predetermined wait time must be sufficient for the slowest core in that tick to finish its computation. Since the computation time of each core in each tick depends on the data at the input to the core at that tick, the slowest core at one particular tick may be faster to finish at other ticks. Accordingly, a global time barrier has to wait on each tick for the slowest core at that tick.

In some neuromorphic systems, multiple chips are connected via tiling. Connection via tiling allows neurons on one chip to send data to axons on another chip using the same graphical connectivity as applied within the cores on a single chip. While the data may take more time to travel, the computation model remains the same. Given a global timing model, to ensure correct computation for any possible graph, all the cores and neurons have to complete their computation before the global T1 clock is advanced—simultaneously—for all chips. To mitigate the longer travel time of data across chips, the computation model may include axon delays that send the data with some delay information, telling the receiving axon to withhold the data for predetermined time before applying it to the neuron computation. This allows for extended travel time without breaking the requirement for all data before computing the next tick. Even in such approaches, the global tick still needs to be applied according to the slowest core amongst all chips on every tick. In general, the larger the network, the slower this slowest core will be and the slower the tick advances are made.

In some neuromorphic systems, multiple chips are installed in multiple boards, each containing its own mechanism to control its chip(s) T1 clock. For example, boards may be connected via Ethernet communication network, via a PCIe communication network, or via other networks. Synchronization between boards presents a significant challenge. In particular, where communication between neurons on one board and axons on another board are established, all participating boards must operate on the same tick. To avoid the need to synchronize ticks between multiple boards, in some embodiments, each board computes independently of one another.

It will be appreciated that a neuron, a group of neurons, a core, a group of cores, a chip, or a group of chips may each compute its next tick t+1 function for its neurons as soon as it has completed tick t and has received all the input from tick t from all other neurons, cores, and chips it receives data from. Accordingly, as a matter of computational accuracy, a given unit need only wait for its inputs. Thus, according to various embodiments of the present disclosure, local synchronization is provided in place of a global time barrier.

A given graph may be divided into several sub-graphs, each receiving data from and sending data to some of the other sub-graphs. For each sub-graph, computation may begin when all input data for tick t is ready. A local T1 clock may then be advanced when computation for tick t has been completed within that subgraph. This clock advance may be performed independently of the current tick or computation state of any other subgraph. Thus, a given sub-graph's complete input data, time stamped with a data tick number, is sufficient to determine when to commence a tick for each given sub-graph.

Graph partitioning has a significant impact on the flow, dependency, and efficiency of sub-graph computation. As each sub-graph only depends on the sub-graphs providing input to it, increased efficiency may be obtained by partitioning such that the computation of each graph partition span only a short number of ticks. This is described further below. Local synchronization takes advantage of the structure of a particular graph. While a global time barrier is suitable for any network, local synchronization need only be sufficient for a given graph.

Figure 3:
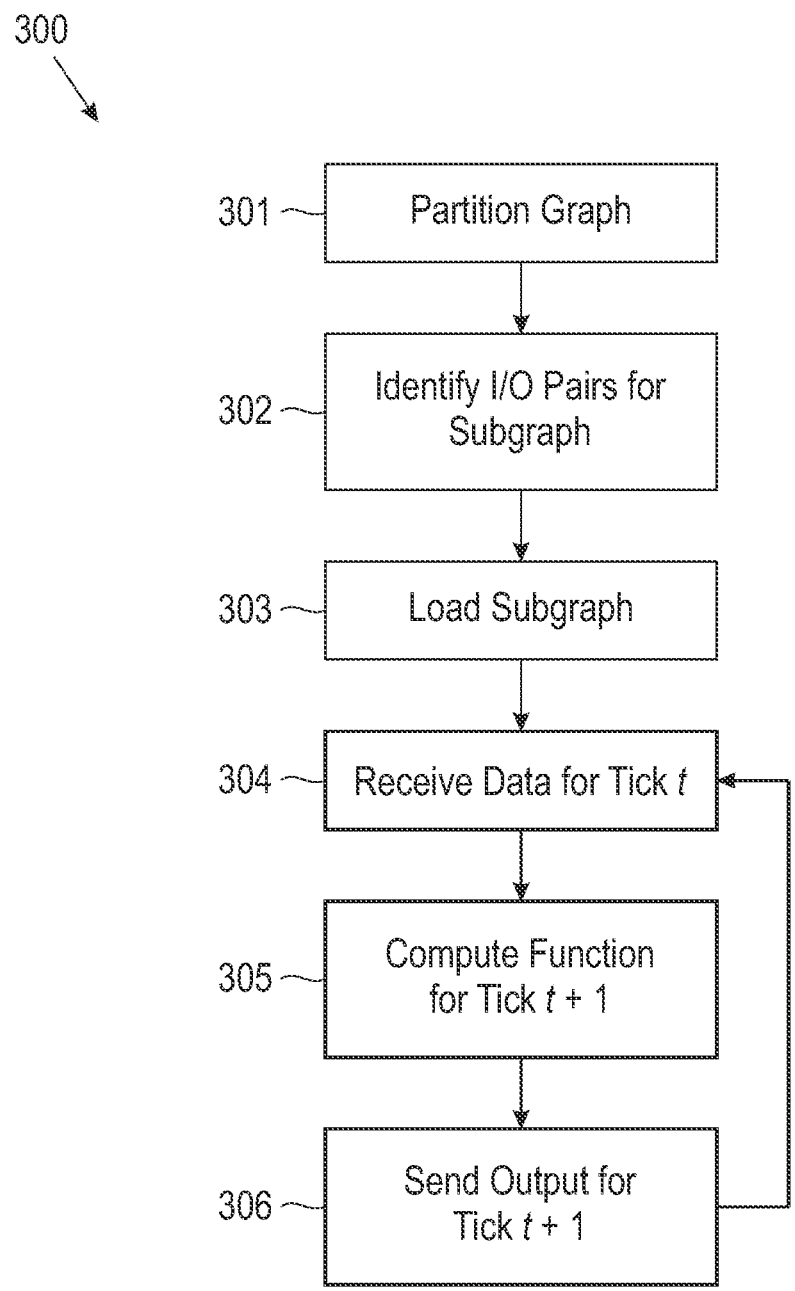
FIG. 3 illustrates a method of distributed, event-based computation according to embodiments of the present disclosure.

Referring now to FIG. 3, an algorithm for providing local synchronization in a distributed neurosynaptic network is illustrated. At 301, a given graph corresponding to a neurosynaptic network is partitioned into sub-graphs. At 302, for each sub-graph, its input and output connection pairs with other sub-graphs are identified. At 303, each sub-graph is loaded to an available computing resource, and a direct communication channel is created from each output to the corresponding input. At 304, for each of the sub-graphs independently, all input data for a given tick t is received. At 305, the function for tick t+1 is computed. At 306, output for tick t+1 is sent.

Figure 4:
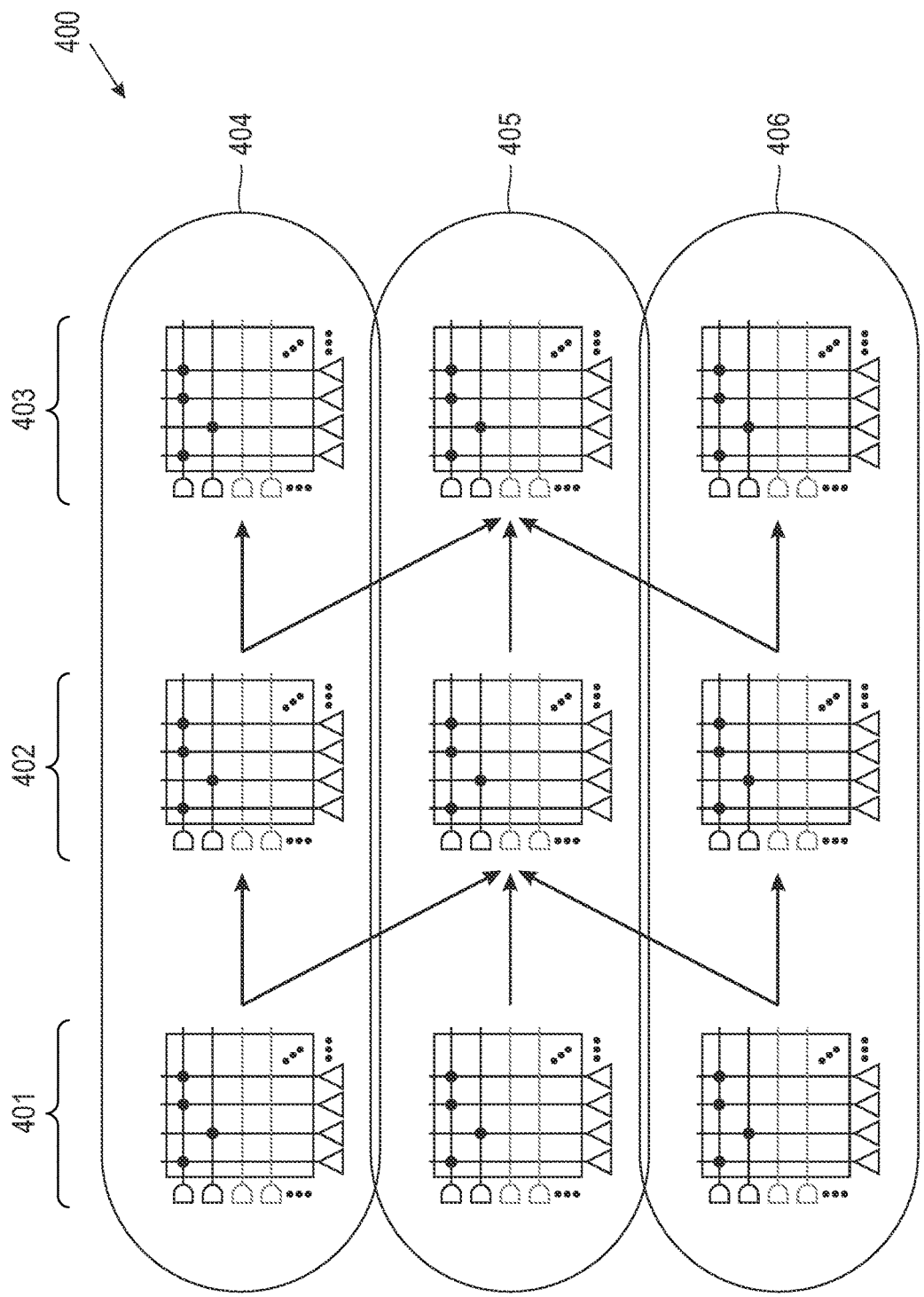
FIG. 4 illustrates an exemplary partitioning scheme of a multilayer neural network according to embodiments of the present disclosure.

Referring now to FIG. 4, an exemplary partitioning of a multi-layer neural network is illustrated. Neural network 400 includes layers 401 . . . 403. Each layer includes three cores, connected in a feed-forward networks as shown. For the purposes of illustration, it is assumed that the processing time through each layer is 4 ticks. If all the cores in all layers operate using the same global tick, twelve ticks would be required to generate an output from an input.

Figure 5:
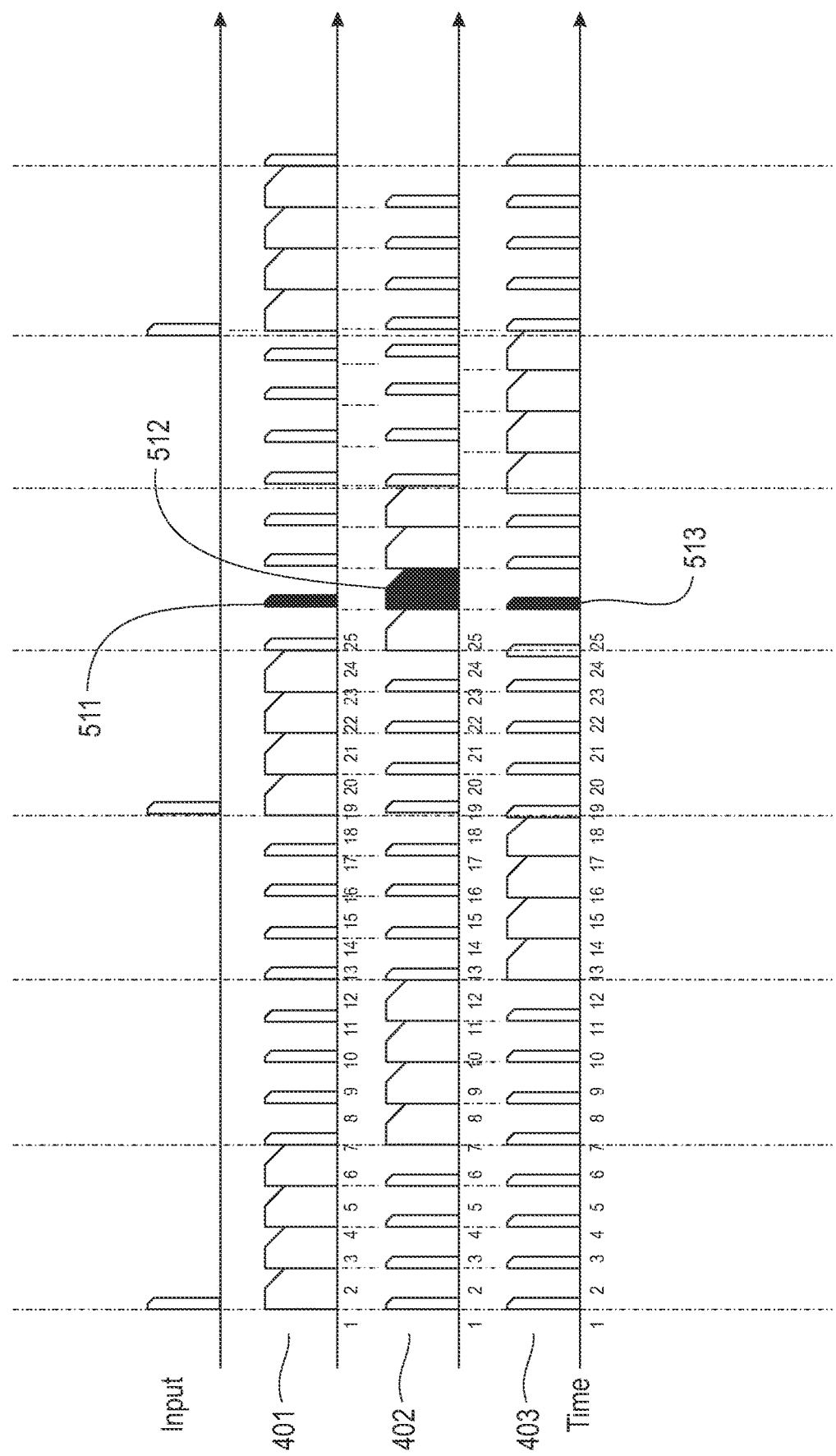
FIG. 5 illustrates an exemplary timing of the network of FIG. 4 according to embodiments of the present disclosure.

Referring to FIG. 5, exemplary timing of the network of FIG. 4 is illustrated. Each tick is of the same duration for all of layers 401 . . . 403. In this figure, the period of computation is illustrated by the bars along the time axis for each layer. In this example, the progression of an input from layer to layer may be observed through the increased computation at each layer in sequence. It will be appreciated that regardless of the layer performing the most computation at each tick, all cores operate on the same tick schedule, resulting in under-utilization of each layer.

Where the network is partitioned into three partitions 404 . . . 406, as pictured, the overall timing is not modified by the creation of a local clock for each partition. In particular, because each partition includes cores from each of the layers, the partitioning has no timing advantages.

Figure 6:
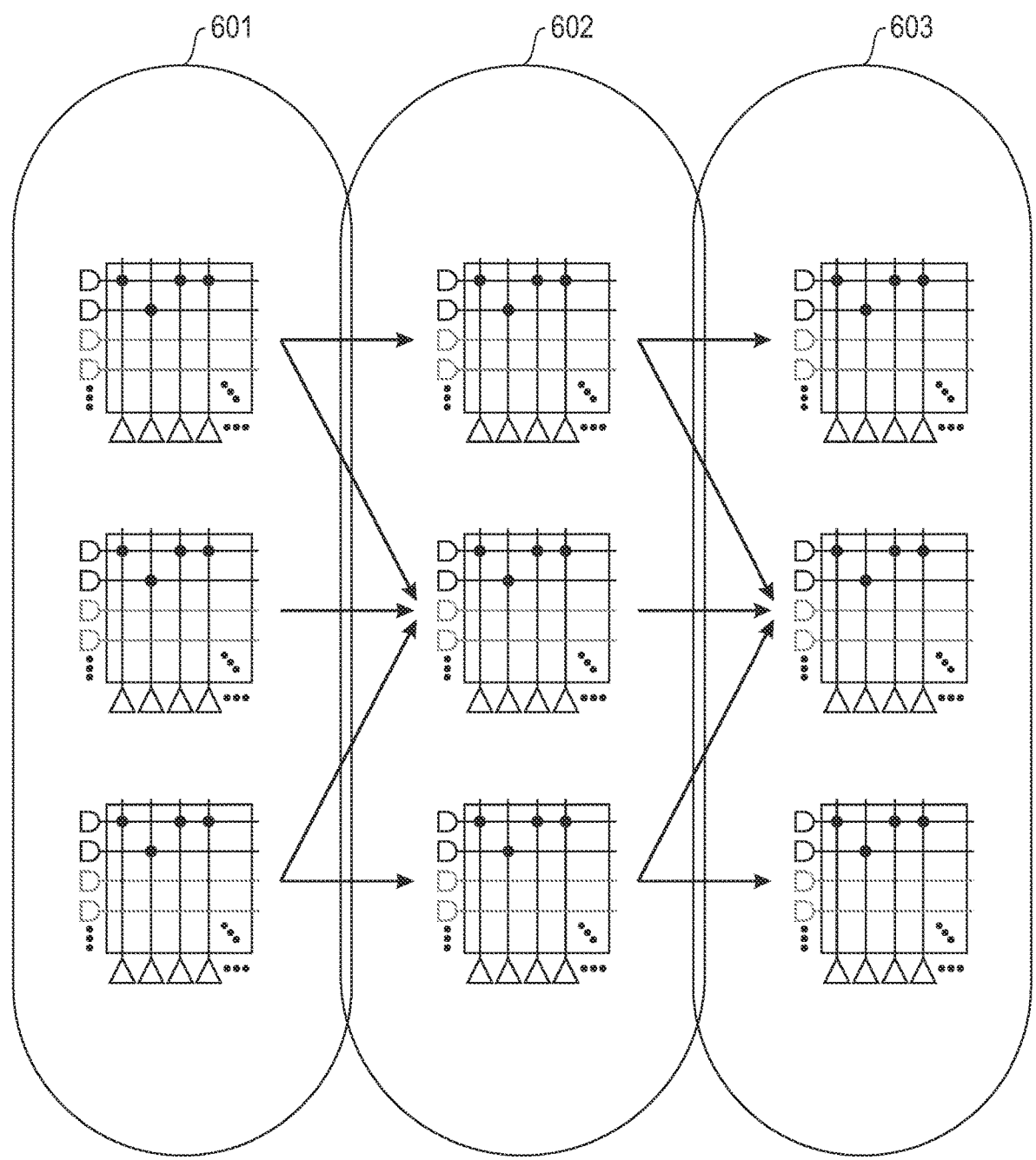
FIG. 6 illustrates another exemplary partitioning scheme of a multilayer neural network according to embodiments of the present disclosure.

Referring now to FIG. 6, an alternative partitioning of the same cores is illustrated. Each partition 601 . . . 603 contains one layer of the neural network.

Figure 7:
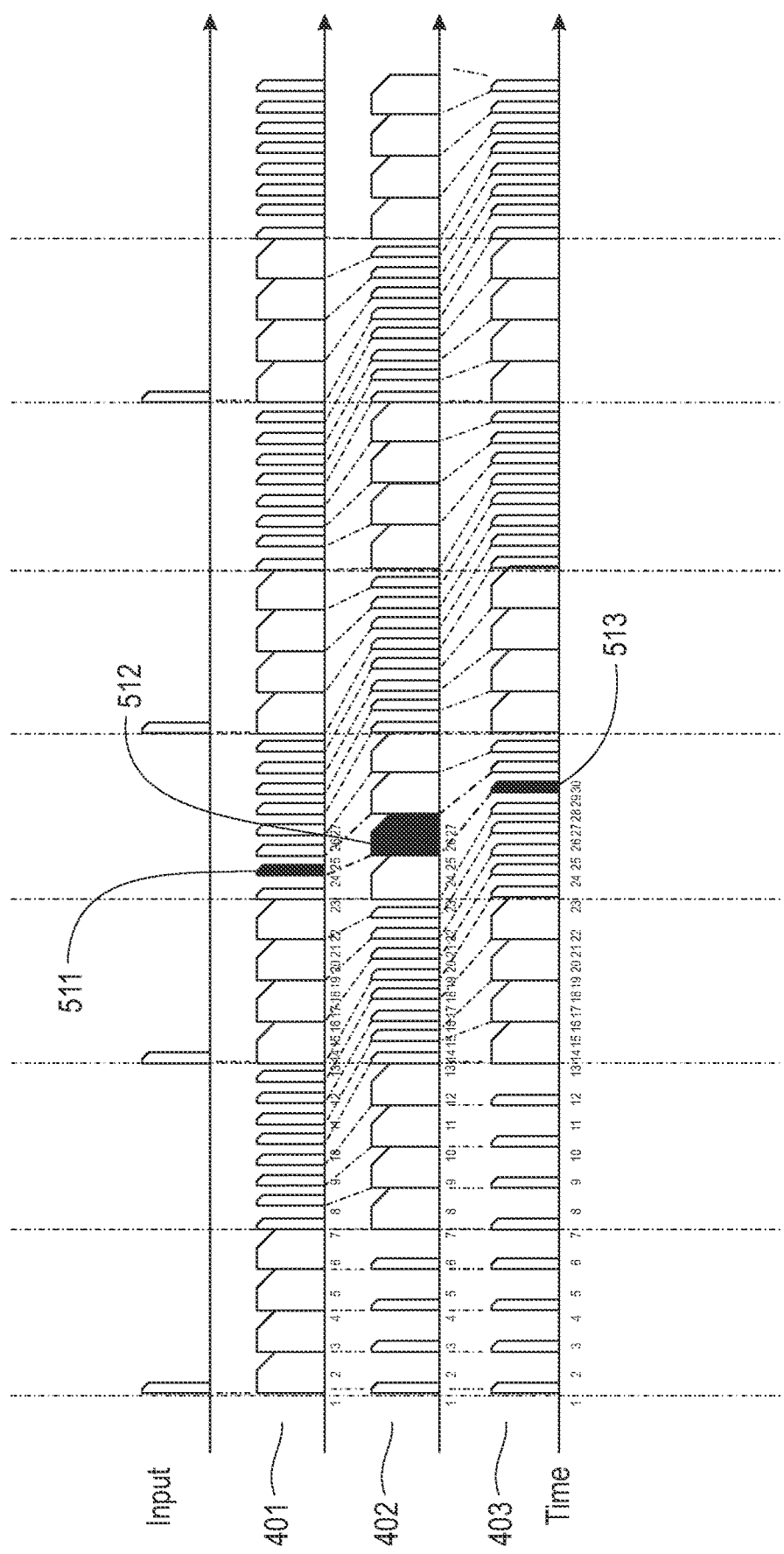
FIG. 7 illustrates an exemplary timing of the network of FIG. 6 according to embodiments of the present disclosure.

Referring now to FIG. 7, exemplary timing according to the partitioning of FIG. 6 is illustrated. In this example, each layer has its own local tick clock. Accordingly, tick duration can vary. When one layer computes, another layers may advance its clock quickly and move on to process new data. As a result, the input rate can be increased. The three partitions are no longer fully synchronized. For example, computations 511 . . . 513, which occur during the same tick in the timing of FIG. 5, are no longer synchronized in the timing of FIG. 7.

With reference to this timing diagram, it will be appreciated that buffering is required between partitions. For example, layer 401 can be as many as 4 ticks ahead of layer 402, which in turn can be 4 ticks ahead of layer 403. In this illustration, after each processing cycle of 12 ticks the layers catch up with each other and the buffers are emptied. The overall system performance is increased by replacing global synchronization with local synchronization, as will be appreciated from the reduction in overall time depicted in the timing diagrams of FIG. 5 and FIG. 7.

In particular, if the processing of data is sequential and stalled by previous stages of the network, as illustrated in FIG. 5, the total execution time is the sum of execution time of each layer. In particular, where $T_1$, $T_2$, $T_3$ are execution times for each layer of a network, then the overall execution time per frame is $(T_1+T_2+T_3)$, or $n(T_1+T_2+T_3)$ for n frames. If the graph is partitioned by layers as illustrated in FIG. 7, each layer of the network can be executed independently, and the execution time may be as low as $\max(T_1,T_2,T_3)$ per frame.

As noted above, an overall network graph may be partitioned into several connected sub-graphs. In some embodiments, the subgraphs are saved to a model file to be loaded onto available neuromorphic systems. It will be appreciated that a variety of partitioning schemes may be applied according to the present disclosure.

When a neural network is partitioned into several components, or partitions, each processed by a neurosynaptic system, the communication topology between the partitions can also be modeled by a graph. Specifically, it can be modeled as a directed graph, where each partition is marked by a node in the partition graph and the communication from an output of one partition to the input of another partition is represented as a directed edge between the corresponding nodes. There are multiple possible partitions of a given neural network, each resulting in a partition graph.

In various embodiments, acyclic partition graphs are generated. An acyclic directed graph is a directed graph with no directed cycles. The graph nodes (corresponding to neurosynaptic partitions) can then be enumerated by a partial order, where for any two partitions i,j connected with a directed edge $e_{ij}$ the indices satisfy i<j. When the partitions form an acyclic directed graph, the synchronization between the clock of the different partitions is less constrained, enabling potential processing speed benefits such in the examples above. In this case, the temporal synchronization constraints are all of the form $t_i \geq t_j$. Hence, in acyclic partition graph, a partition with a lower index is not blocked by any partition with a higher index, and can further progress in its computation independently of those.

Even where a neurosynaptic network contains cycles, it may still be partitioned into an acyclic partition graph. To achieve that goal, each of the network cycles has to be contained in its entirety in one partition. For example, a 15-layers convolutional network with a recurrence (cycle) between layer 6 and 4 can be partitioned into three partitions, one containing layers 1-3, the second containing layers 4-6, and the third containing layers 7-15. This partitioning would be acyclic despite the overall network having cycles.

In various embodiments, the partitioning algorithm detects a cycle in the neural network and clusters all the neurons along the cycle into one partition. This process may be repeated for all remaining cycles, resulting in an acyclic partition graph. It will be appreciated that partitioning may be achieved by a variety of graph clustering approaches. It can be also addressed by a variety of VLSI graph partitioning algorithms including Kernighan-Lin algorithm, FDP (Force Directed Placement), or Hierarchical clustering algorithms.

Different partition graphs for the same network may represent a tradeoff between processing time and the communication event rate required. One partitioning may impose less timing constraints and thus enable faster processing, while also requiring higher communication bandwidth between the neurosynaptic processing units.

In some embodiments, additional information regarding each available neuromorphic enabled system is considered when performing the partitioning. For example, in addition to the number of available cores, attribute may include whether a system is simulated or hardware enabled, the number of network ports, the cost and performance of its implementation, energy usage, or communication infrastructure quality such as bandwidth and latency between pairs of systems.

In various embodiments, output connectors are associated with each subgraph. Connectors provide a logical abstraction that define inputs and outputs to a sub-graph in terms of connectors and a pins. Each pin on each input connector will map to an axon on a core expecting input from another sub-graph, and each neuron on each core outputting to another sub-graph will map to a pin on an output connector.

Once partitioning is complete, input and output connectors are created. In a simple approach, one input and one output connector is constructed for each partition. The size of the input connector for each partition corresponds to the number of axons within the cores of a partition that are configured to receive input from neurons in other partitions. Similarly, the size of each partition's output connector corresponds to the number of neurons within a partition that are configured to send output to axons in other partitions. The input connector for a partition may comprise a list, sized as described above, of the core/axon pairs that are configured to receive input from other partitions. In some embodiments, the list is generated by iterating over the neurons in all of the other partitions and identifying those that target core/axon pairs within this partition.

The output connector may likewise comprise a list, sized as described above, where each element in the list consists of four values, with those values being the core and neuron that generated the event destined for an external partition, along with the partition number and ping number that this event targets. Creation of the output connectors may be done after all of the input connectors, and may be done by iterating over all of the cores within a partition. For each neuron in the partition that is configured for output, the target partition and pin in the partition's input connector are looked up, and the set of values (core, neuron, partition number, pin number) are added to the output connector.

In some embodiments, rather than creating a single large output connector for each partition, each partition has N output connectors, where N is the total number of partitions. In this way, one connector is configured per partition that a given partition is connected to. Each entry in these output connectors may have three values rather than four, with the destination partition being omitted as redundant. Partition-specific output connectors may be configured as described above, by iterating over each neuron configured to send events to another partition, looking up the destination core/axon in that partition to get the pin number, and then adding an entry to the partition-specific output connector for the current partition.

Based on the set of partitions and the connectivity graph, neuromorphic enabled systems get allocated from a set of available systems. All the boards, being hardware or simulated, have a assigned IP address and a set of available TCP ports which can be used for TCP streams. In a cloud environment connectivity can be further limited by firewall and other security means which will reduce the potential options for an allocation algorithm.

Figure 8A:
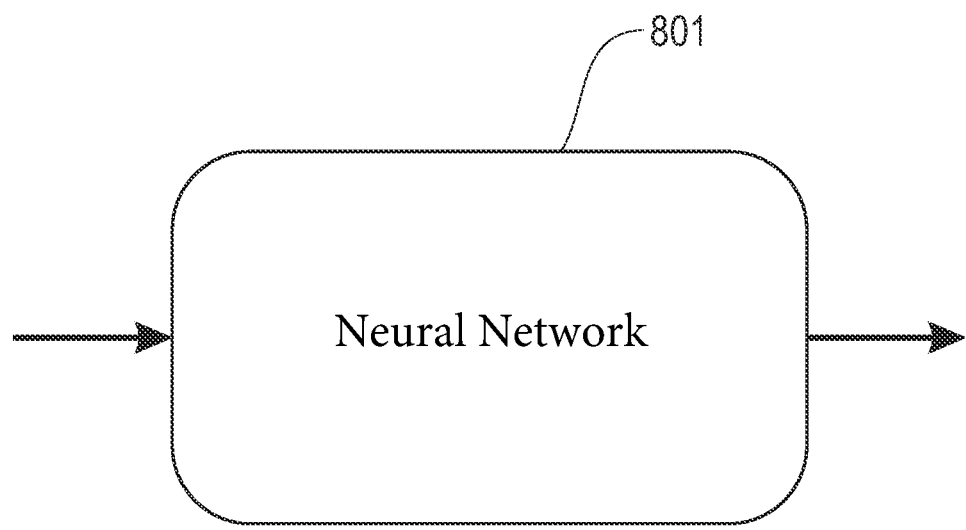
FIGS. 8A-C illustrate an exemplary partition according to embodiments of the present disclosure.
Figure 8B:
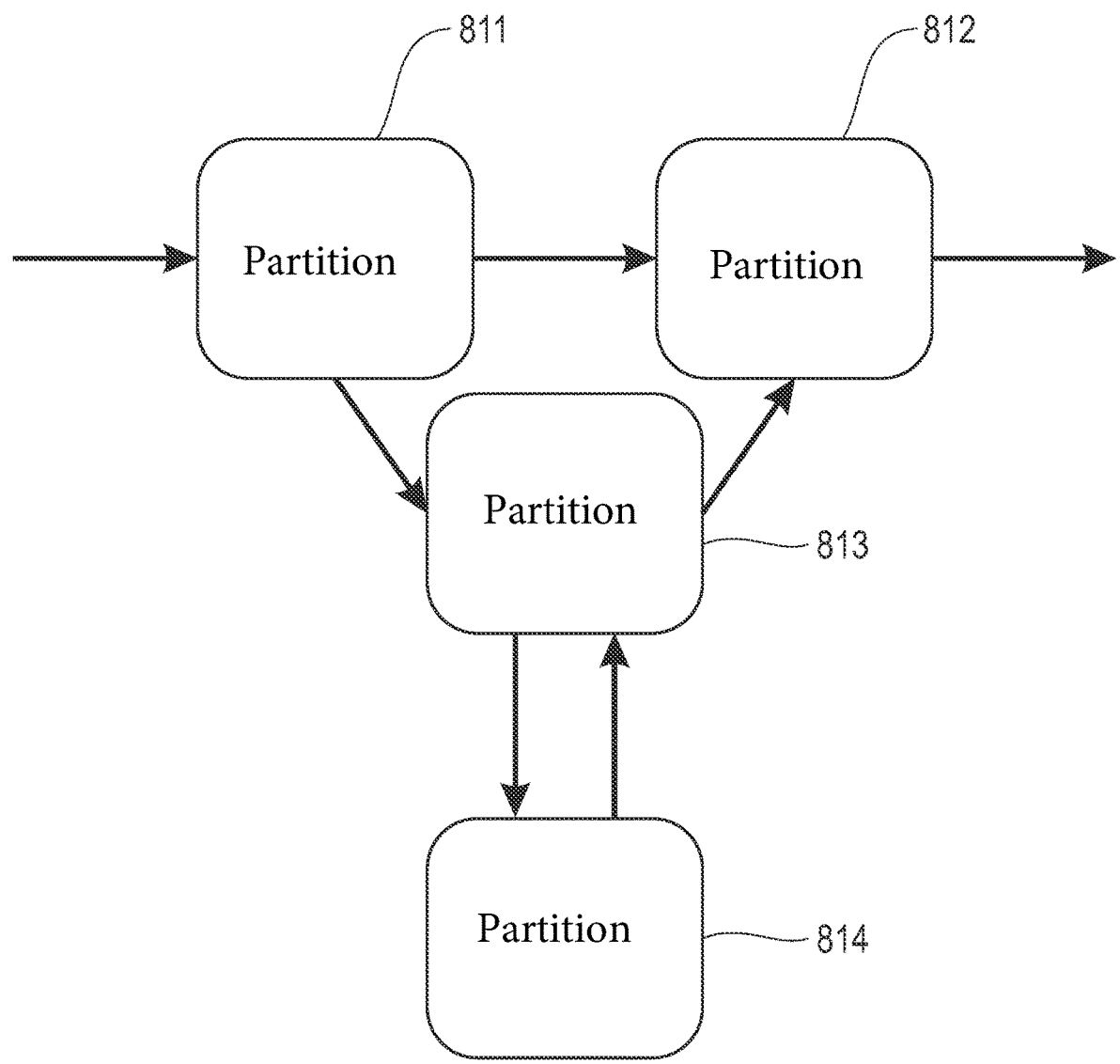
Figure 8C:
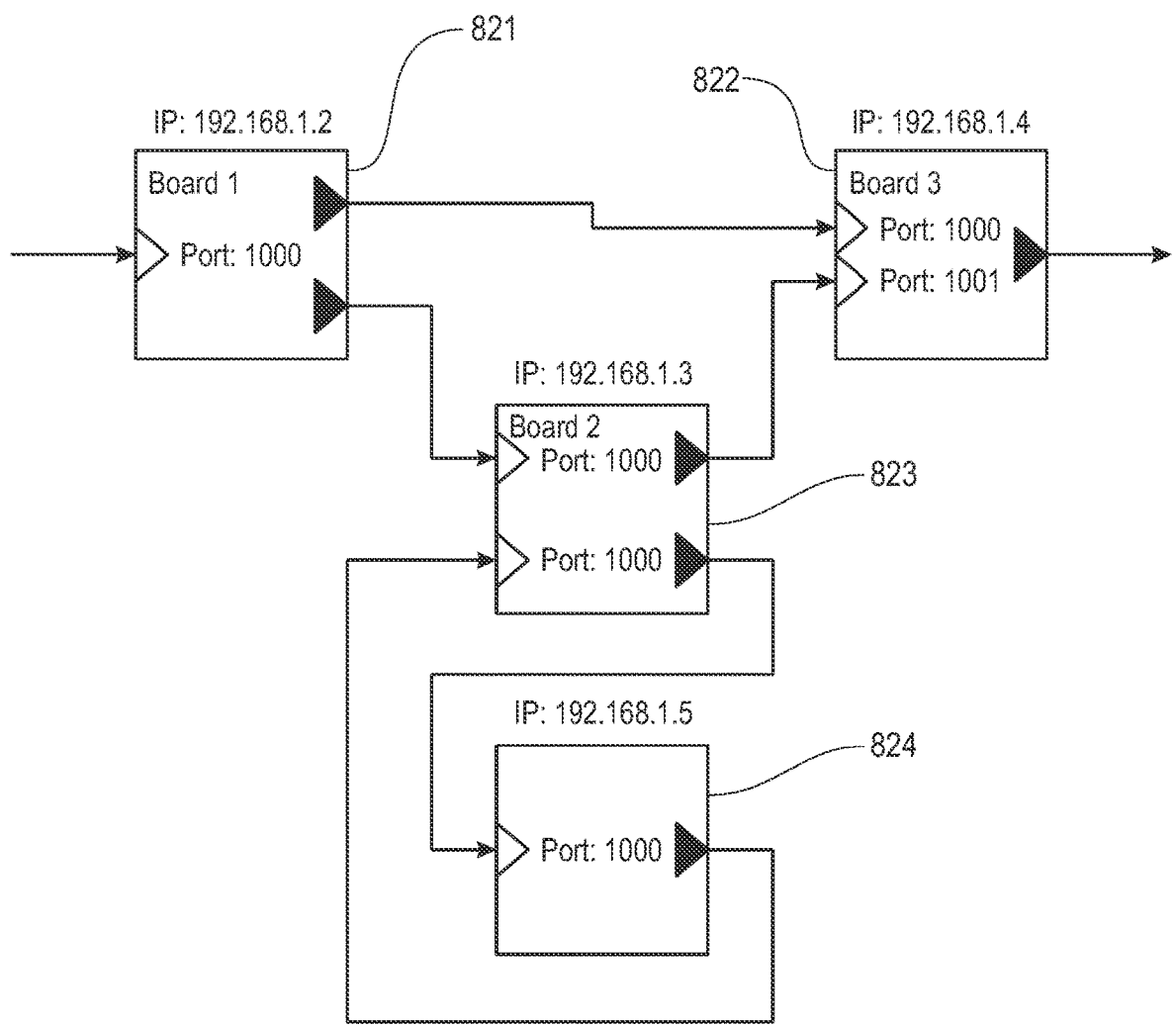

Referring now to FIGS. 8A-C, an exemplary partition is illustrated according to embodiments of the present disclosure. Neural network 801, having input and output, is partitioned into four partitions 811, 812, 813, and 814. The partitions include feed-forward and feedback partitions.

In this example, the four partitions are mapped to four neurosynaptic systems 821 . . . 824. For example, systems 821 . . . 824 may include neurosynaptic boards each having a plurality of chips and cores. Provisioning each system may include sending the model files and connector information for each partition. In various embodiments, systems are checked for sufficient resources and number of ports prior to provisioning, to guarantee the ability to instantiate all of the required input connections. It is assumed that each system can reach the other systems thru means of a network, such as an IP network. In this example, an IP address is provided for each system, and a port number is provided for each inbound port.

In some embodiments, multiple systems are allocated for a given partition. In this way, fault tolerance may be provided. Communication may be split at each output port and then converged on the input port. Error detection may be implemented on each input, such as comparing the spikes from two different boards to detect divergences, or triple-mode redundancy.

Figure 9A:
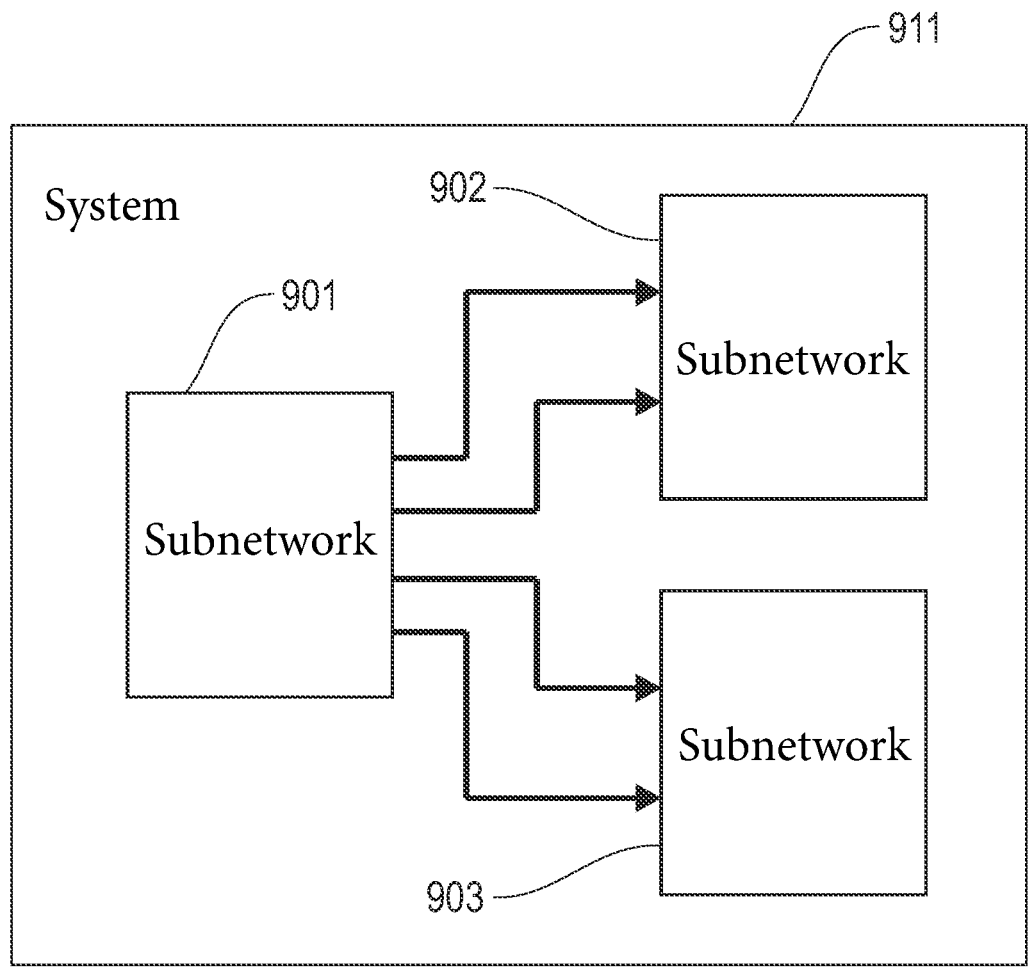
FIGS. 9A-B illustrate the partitioning of a monolithic model into three separate partitions according to embodiments of the present disclosure.
Figure 9B:
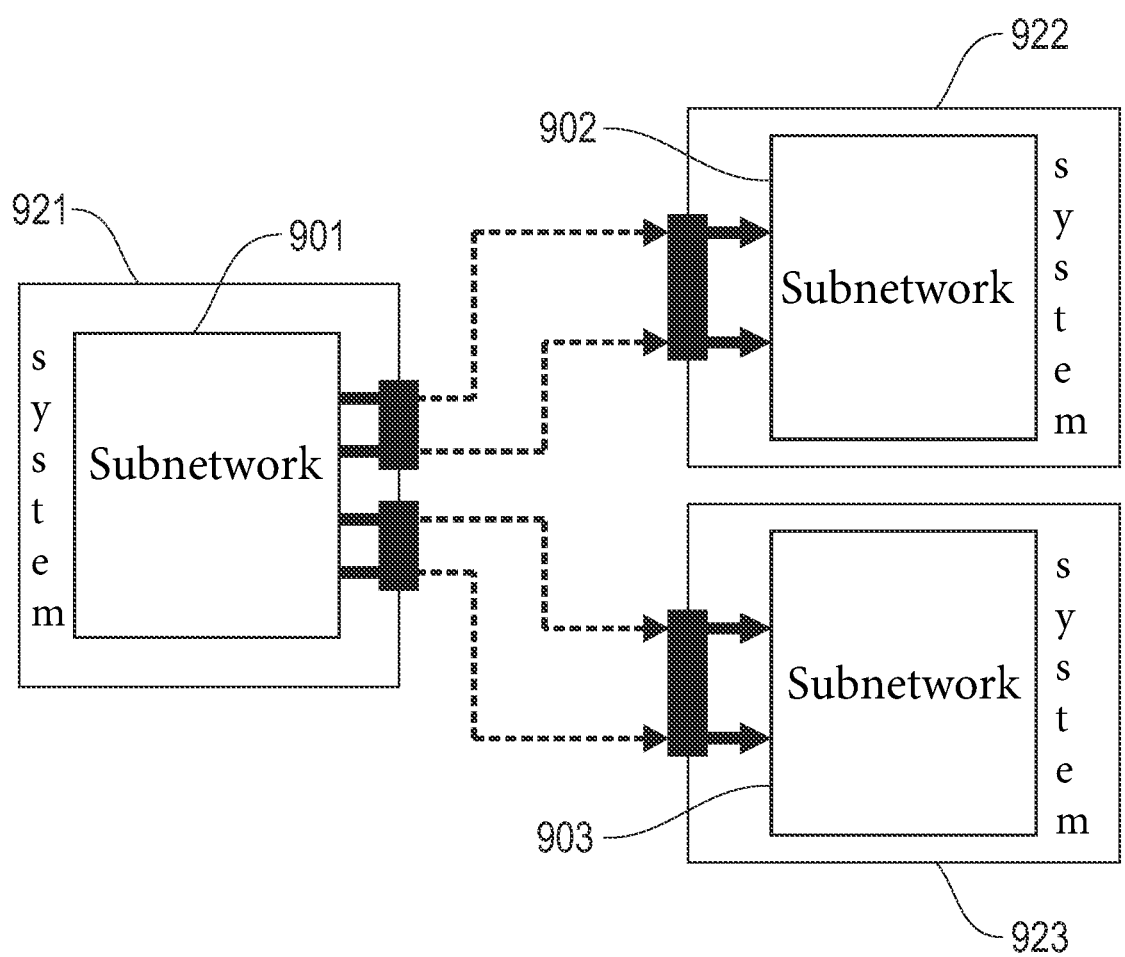

Referring to FIGS. 9A-B, a partitioning of a monolithic model into three separate partitions is illustrated according to embodiments of the present disclosure. Subnetworks 901, 902, and 903 make up a single network. Without partitioning, subnetworks 901, 902, and 903 are located on a single system (e.g., a single board) 911. After partitioning, subnetworks 901, 902, and 903 are mapped to systems 921, 922, and 923, which are loosely connected via partition-specific input and output connectors.

After allocation of the systems is complete, each system is configured according to its model and may begin runtime operation. Point-to-point communication channels between the systems are established and maintained according to each connector definition. Data streams are received over these input channels. Data streams are provided on these output channels. During runtime, the T1 clock is controlled locally for each system. The network may also contain non-neuromorphic hardware resources (e.g., CPU, GPU) that may be responsible for encoding real-valued signals into events, decoding events into real-valued signals, or simulating neuromorphic chips on a non-neuromorphic platform.

At the start of runtime operation, each hardware resource waits for inbound connections from the other hardware resources in its input list and establishes outbound connections with all hardware resources in its output list. Communication can take place over any lossless communication infrastructure, such as TCP/IP over Ethernet.

Once each input connection is established, each hardware resource may begin to receive input data streams. In some embodiments, the input data stream confirms with a spike file connector pin format (SFCP). The SFCP format contains tick blocks followed by event blocks. Tick blocks indicate the T1 clock value on which the subsequent event blocks are to be applied. Tick numbers are monotonically increasing. Event blocks contain the connector and pin number of events to be used as input to the neuromorphic chip. Connector-pin events may be mapped to physical cores at runtime through a look-up-table or algorithmic mapping. Each input communication channel starts to process tick and event blocks once a connection is established. In various embodiments, communication channels receive data independently and asynchronously.

On a given channel, when a tick block with tick number t is received, it indicates that the upstream resource has sent all events for tick numbers less than t. The tick number t−1 is used to update an array that stores the last completed tick number for each communication channel. The T1 clock is then incremented to a value equal to the minimum of the array values. This procedure guarantees all events for a particular tick number have been received from all channels before the T1 clock is incremented to that tick. At any given time, input streams on different channels may be sending data for different ticks and different systems may be computing at different ticks. Data for ticks greater than the current T1 clock are buffered for future delivery. In some embodiments, if buffering resources are unavailable, the communication channels blocks until resources become available.

After the T1 clock is incremented, events may be available for reading from the neuromorphic chip. The end of the tick is identified when all data are read or a pre-determined time has elapsed since the last increment of the T1 clock. At the end of the tick, output neurosynaptic core event data is converted as necessary for output. In some embodiments, the data are converted to a connector-pin representation as described above. In such embodiments, the conversion may be performed through look-up-tables or algorithmic mapping. On each output channel, a tick block with the current T1 clock is sent followed by that channels event blocks.

It will be appreciated that the computation model provided herein is applicable to a variety of system configurations. For example, a network model having K chips to be run on M boards (or other neuromorphic systems) where M<K. The overall computation may be achieved by having a simulator for the neuromorphic hardware for the remaining K−M chips. In this way, a hybrid system may be provided that includes neuromorphic systems (such as neuromorphic chips and boards), software simulators (emulating neuromorphic computation), and CPUs or GPUs for neural transduction (encoding) and decoding of spikes.

In addition, when M<K, this approach may be used to process in batches. This is particularly useful for graphs with acyclic partitioning. In particular, the first M subgraphs may be loaded into the M boards. Communication may then be connected between them, and they may be run on input data. All outputs of the first M modules may be collected, for example in a file or buffer. Once computation completes for a number of ticks (e.g., $10^6$ ticks, or 1000 seconds), the next M subgraphs may be loaded into same M boards. Those modules may then be provided the stored events to perform their computation. This process may proceed until all K subgraphs have been processed. This allows the computation of large networks with limited hardware.

For example, the present disclosure may be applied to map a K chip model onto a single neuromorphic chip instance. Given a limited number of cores on the chip, the layers in the network may be sequentially clustered such that they don't exceed the core limit. The partitions may then be loaded in sequence onto a single chip (or board). In this way, the individual portions of the network may be run iteratively to complete the entire stack of layers. Accordingly, a network of arbitrary size may run on limited hardware.

In various embodiments, a neural network is partitioned and then loaded and processed on a plurality of neuromorphic enabled systems. In particular, the network is partitioned into two or more components. A communication graph is created between the components. The components are loaded into neuromorphic enabled systems. The neuromorphic enabled systems are run using event-based local synchronization as described herein.

Figure 10:
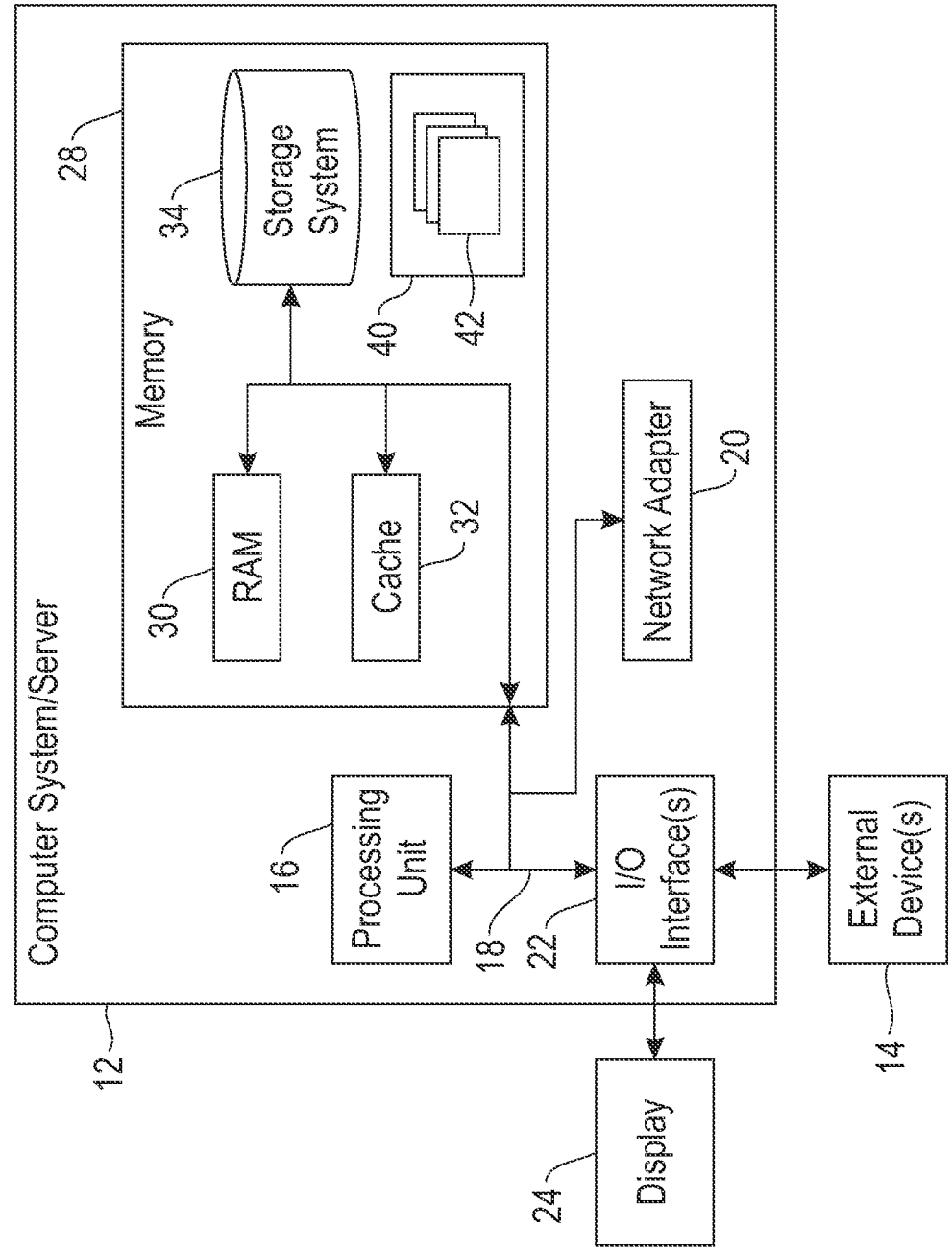
FIG. 10 depicts a computing node according to an embodiment of the present invention.

Referring now to FIG. 10, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a plurality of neurosynaptic processors each of the plurality of neurosynaptic processors including a clock local thereto; and
    a network interconnecting the plurality of neurosynaptic processors, wherein
        the clock of each neurosynaptic processor is uncoupled from the clock of each other neurosynaptic processor,
        each neurosynaptic processor is adapted to receive an input stream, the input stream comprising a plurality of inputs and a clock value associated with each of the plurality of inputs, wherein the clock value is different from the plurality of inputs and originates at another of the plurality of neurosynaptic processors,
        each neurosynaptic processor is adapted to compute, for each clock value, an output based on the inputs associated with the clock value, wherein the inputs comprise a neuron state and a vector of axonal inputs, and wherein the output comprises a neuron state associated with a subsequent clock value and a neuron output associated with the subsequent clock value,
        each neurosynaptic processor is adapted to send to another of the plurality of neurosynaptic processors, via the network, the output and an associated clock value.

2. The system of claim 1, wherein the plurality of neurosynaptic processors comprises at least one neurosynaptic core, neurosynaptic chip, simulated neurosynaptic core, or simulated neurosynaptic chip.

3. The system of claim 1, wherein the system further comprises:
    at least one GPU coupled to the network.

4. The system of claim 3, wherein the GPU is adapted to encode the plurality of inputs.

5. The system of claim 3, further comprising an event buffer, the system being adapted to:
    route the output and an associated clock value from a first of the neurosynaptic processors to the event buffer;
    load a new model to the plurality of neurosynaptic processors; and thereafter provide from the event buffer input to the plurality of neurosynaptic processors.

6. The system of claim 1, wherein each neurosynaptic processor is configured with a partition of a neural network.

7. The system of claim 6, wherein the partition is determined by minimizing one or more of total power consumption, total computation time, total network latency, or total communication over the network.

8. The system of claim 1, wherein the network comprises an Ethernet network.

9. The system of claim 1, wherein the network comprises a TCP/IP network.

10. The system of claim 1, wherein each of the plurality of neurosynaptic processors comprises at least one input port and at least one output port.

11. A method comprising:
    partitioning a neural network into a plurality of partitions;
    determining a communication graph interconnecting the plurality of partitions;
    loading each of the plurality of partitions onto one or more neurosynaptic processor;
    providing a plurality of network connections interconnecting the plurality of neurosynaptic processors according to the communication graph;
    providing a clock local to each neurosynaptic processor, the clock of each neurosynaptic processor being uncoupled from the clock of each other neurosynaptic processor;
    at each neurosynaptic processor:
        receiving an input stream, the input stream comprising a plurality of inputs and a clock value associated with each of the plurality of inputs, wherein the clock value is different from the plurality of inputs and originates at another of the plurality of neurosynaptic processors,
        computing, for each clock value, an output based on the inputs associated with that clock value, wherein the inputs comprise a neuron state and a vector of axonal inputs, and wherein the output comprises a neuron state associated with a subsequent clock value and a neuron output associated with the subsequent clock value, and sending to another of the plurality of neurosynaptic processors, via the network, the output and an associated clock value.

12. The method of claim 11, wherein the one or more neurosynaptic processor comprises at least one neurosynaptic core, neurosynaptic chip, simulated neurosynaptic core, or simulated neurosynaptic chip.

13. The method of claim 11, further comprising:
encoding the input stream by at least one GPU.

14. The method of claim 11, further comprising:
routing the output and an associated clock value from a first of the neurosynaptic processors to an event buffer;
loading a new model to the plurality of neurosynaptic processors; and thereafter providing from the event buffer input to the plurality of neurosynaptic processors.

15. The method of claim 11, further comprising:
configuring each neurosynaptic processor with a partition of the neural network.

16. The method of claim 15, further comprising:
determining the partition by minimizing one or more of total power consumption, total computation time, total network latency, or total communication over the network.

17. The method of claim 11, wherein the network comprises an Ethernet network.

18. The method of claim 11, wherein the network comprises a TCP/IP network.

19. The method of claim 11, wherein each of the one or more neurosynaptic processor comprises at least one input port and at least one output port.

20. A computer program product for distributed, event-based computation, the computer program product comprising a computer readable storage medium having program instructions embodied therewith, the program instructions executable by a processor to cause the processor to perform a method comprising:
partitioning a neural network into a plurality of partitions;
determining a communication graph interconnecting the plurality of partitions;
loading each of the plurality of partitions onto one or more neurosynaptic processor;
providing a plurality of network connections interconnecting the plurality of neurosynaptic processors according to the communication graph;
providing a clock local to each neurosynaptic processor, the clock of each neurosynaptic processor being uncoupled from the clock of each other neurosynaptic processor;
at each neurosynaptic processor:
receiving an input stream, the input stream comprising a plurality of inputs and a clock value associated with each of the plurality of inputs, wherein the clock value is different from the plurality of inputs and originates at another of the plurality of neurosynaptic processors,
computing, for each clock value, an output based on the inputs associated with that clock value, wherein the inputs comprise a neuron state and a vector of axonal inputs, and wherein the output comprises a neuron state associated with a subsequent clock value and a neuron output associated with the subsequent clock value, and
sending to another of the plurality of neurosynaptic processors, via the network, the output and an associated clock value.

21. The computer program product of claim 20, wherein the one or more neurosynaptic processor comprises at least one neurosynaptic core, neurosynaptic chip, simulated neurosynaptic core, or simulated neurosynaptic chip.

22. The computer program product of claim 20, the method further comprising:
encoding the input stream by at least one GPU.

23. The computer program product of claim 20, the method further comprising:
routing the output and an associated clock value from a first of the neurosynaptic processors to an event buffer;
loading a new model to the plurality of neurosynaptic processors; and thereafter providing from the event buffer input to the plurality of neurosynaptic processors.

24. The computer program product of claim 20, the method further comprising:
configuring each neurosynaptic processor with a partition of the neural network.

25. The computer program product of claim 24, the method further comprising:
determining the partition by minimizing one or more of total power consumption, total computation time, total network latency, or total communication over the network.

* * * * *